United States Patent
Kim et al.

(10) Patent No.: US 7,710,914 B2
(45) Date of Patent: May 4, 2010

(54) DEVICE AND METHOD FOR ADAPTIVELY CONTROLLING TURN-ON TIME OF TRANSCEIVER

(75) Inventors: Ji-tae Kim, Yongin-si (KR); Soon-jin Choi, Seongnam-si (KR); Seung-hwan Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 700 days.

(21) Appl. No.: 11/356,126

(22) Filed: Feb. 17, 2006

(65) Prior Publication Data

US 2006/0182056 A1 Aug. 17, 2006

(30) Foreign Application Priority Data

Feb. 17, 2005 (KR) ............ 10-2005-0013268

(51) Int. Cl.
*H04Q 7/00* (2006.01)
*G01R 31/08* (2006.01)
*H04Q 7/20* (2006.01)

(52) U.S. Cl. ............... 370/328; 370/252; 455/455

(58) Field of Classification Search ........... 455/455, 455/552.1, 355; 375/240.28, 209; 370/432, 370/261, 222, 338, 278, 335, 468
See application file for complete search history.

(56) References Cited

U.S. PATENT DOCUMENTS

| | | | |
|---|---|---|---|
| 2004/0218683 A1* | 11/2004 | Batra et al. ............... 375/261 |
| 2004/0255001 A1* | 12/2004 | Oh et al. ................... 709/209 |
| 2005/0003794 A1* | 1/2005 | Liu ............................ 455/355 |
| 2005/0075130 A1* | 4/2005 | Godfrey .................. 455/552.1 |
| 2005/0090264 A1* | 4/2005 | Kim .......................... 455/455 |
| 2005/0177639 A1* | 8/2005 | Reunamaki et al. ...... 709/227 |
| 2005/0259754 A1* | 11/2005 | Ho et al. ............... 375/240.28 |
| 2006/0056322 A1* | 3/2006 | Simpson et al. .......... 370/278 |
| 2006/0251098 A1* | 11/2006 | Morioka .................... 370/432 |
| 2008/0107089 A1* | 5/2008 | Larsson et al. ............ 370/338 |

* cited by examiner

*Primary Examiner*—Charles N Appiah
*Assistant Examiner*—Kiet Doan
(74) *Attorney, Agent, or Firm*—Sughrue Mion, PLLC

(57) ABSTRACT

A device and method for adaptively controlling a turn-on time of a transceiver so that power consumption is reduced. The device includes a transceiver for receiving a beacon frame broadcasted by a coordinator which coordinates devices, and a controller for determining whether a period of the beacon frame is changed by checking period information in the received beacon frame. The device further includes a beacon frame arrival-time estimation part for estimating an arrival-time of a next beacon frame to be received, based on the changed period information of the beacon frame, a time-error estimation part for estimating a time-errors of the coordinator and the device based on the changed period information of the beacon frame, and a turn-on time estimation part for estimating a turn-on time of a transceiver based on the estimated beacon frame arrival-time and the estimated time-errors.

9 Claims, 4 Drawing Sheets

DEVICE AND METHOD FOR ADAPTIVELY CONTROLLING TURN-ON TIME OF TRANSCEIVER

CROSS-REFERENCE TO RELATED APPLICATIONS

This application claims priority from Korean Patent Application No. 10-2005-0013268, filed on Feb. 17, 2005, the entire content of which is incorporated herein by reference.

BACKGROUND OF THE INVENTION

1. Field of the Invention

Apparatuses and methods consistent with the present invention relate to adaptively controlling a turn-on time of a transceiver in a Zigbee network.

2. Description of Related Art

A wireless ad hoc network environment is synchronized by a device serving as a coordinator. That is, as for the IEEE 802.11 standard, all devices connecting with a wireless ad hoc network can serve as a coordinator for synchronizing the wireless ad hoc network environment for every beacon frame by using the backoff algorithm.

Meanwhile, in specifications of the IEEE 802.15.1 standard called Bluetooth, the IEEE 802.15.3 and IEEE 803.15.3a standards for high-data-rate wireless personal area network (WPAN), and the IEEE 802.15.4 standard called Zigbee for low-data-rate WPAN, only one coordinator exists while the wireless ad hoc network environment is maintained. Accordingly, beacon frames generated by one coordinator are broadcasted to devices connected to the network at stated periods, so that all the devices are synchronized. That is, each device keeps synchronized by receiving the beacon frames from the coordinator.

FIG. 1 illustrates a Zigbee network configuration in accordance with the related art.

With reference to FIG. 1, a plurality of devices 10, 12, 14, 16 and 18 constitutes a network, and one device 10 in the network serves as a coordinator. The device 10 periodically broadcasts beacon frames, which are synchronization signals, to the other devices 12, 14, 16 and 18, and synchronizes the devices connected to the network. FIG. 1 shows one coordinator 10 and four devices 10, 14, 16 and 18 as a matter of convenience for description, but the number of the devices is not limited to four, and a larger or smaller number of devices can be connected to the ad hoc network.

For the devices to receive beacon frames transmitted from the coordinator, transceivers in the corresponding devices should be turned on. The devices turn on the transceivers considering time errors between timers incorporated in the coordinator and in themselves, and a transmission period of the beacon frames. Meanwhile, the transmission period of the beacon frame is determined by the beacon order ranging from zero (0) to fourteen (14), and the time errors between the coordinator and the devices increase as the transmission period of the beacon frames becomes longer.

FIG. 2 illustrates a timing diagram showing a turn-on time of a transceiver when each device receives beacon frames from a coordinator. Referring to FIG. 2, in a Zigbee system in accordance with the related art, it is assumed that the transmission period of the beacon frames is fixed, so that the transceiver is turned on at a predetermined fixed time. Generally, let the longest transmission period be about 126,000 milliseconds. At this time, the transceiver is turned on at a predetermined fixed time corresponding to the longest transmission period considering some time error.

However, the related art method has a problem that it is unreasonable in the case where the transmission period varies, particularly when the period of the beacon frames becomes shorter. That is, in the case where the transmission period of the beacon frame becomes shorter, the time errors between the coordinator and the device decreases. However, since the related art method turns on the transceiver based on the fixed time error and the transmission period without considering the decreased time errors, it is very inefficient.

SUMMARY OF THE INVENTION

The present invention provides a device and a method for adaptively controlling a turn-on time of a transceiver, and reducing power consumption by adaptively turning on the transceiver in response to a period of a beacon frame, thereby preventing unnecessary operations of the transceiver from being performed.

In accordance with one aspect of the present invention, there is provided a device for adaptively controlling a turn-on time of a transceiver, including a transceiver for receiving a beacon frame broadcasted by a coordinator which coordinates devices, a controller for determining whether a period of the beacon frame is changed by checking period information of the received beacon frame, a beacon frame arrival-time estimation part for estimating an arrival-time of a next beacon frame to be received based on the changed period information of the beacon frame, a time-error estimation part for estimating a time-error between the coordinator and the device based on the changed period information of the beacon frame, and a turn-on time estimation part for estimating a turn-on time of the transceiver based on the estimated beacon frame arrival-time and the estimated time-error.

The controller may control the transceiver so as to be turned on at the turn-on time estimated by the turn-on time estimation part.

Further, the turn-on time of the transceiver may be estimated by an equation as follows:

Equation:

turn-on time of transceiver=estimated arrival-time of beacon frame−(changed time error of coordinator+changed time error of device)

The time error preferably may be proportional to the period of the beacon frame.

Also, the device may further include a storage part for storing the received beacon frame.

In accordance with another aspect of the present invention, there is provided a method of controlling a turn-on time of a transceiver, including receiving a beacon frame broadcasted by a coordinator, determining whether a period of the beacon frame is changed by checking period information of the beacon frame, estimating a turn-on time of the transceiver based on the changed period, and controlling the transceiver to be turned on at the estimated turn-on time.

The turn-on time of the transceiver may be changed in case that the period of the beacon frame is changed.

The estimating a turn-on time of the transceiver may include estimating an arrival-time of a next beacon frame based on the changed period and a time-error between the coordinator and the device, and estimating a turn-on time of the transceiver based on the estimated arrival-time of the beacon frame and the estimated time-error between the coordinator and the device.

The turn-on time of the transceiver may be estimated by an equation as follows:

Turn-on time of transceiver=estimated arrival-time of beacon frame+changed period of beacon frame−(changed time-error of coordinator+changed time-error of device)

The time error may be proportional to the period of the beacon frame.

BRIEF DESCRIPTION OF THE DRAWINGS

The above and/or other aspects of the present invention will be more apparent by describing in detail exemplary embodiments thereof with reference to the attached drawings in which.

DETAILED DESCRIPTION OF EXEMPLARY EMBODIMENTS OF THE INVENTION

Figure 1:
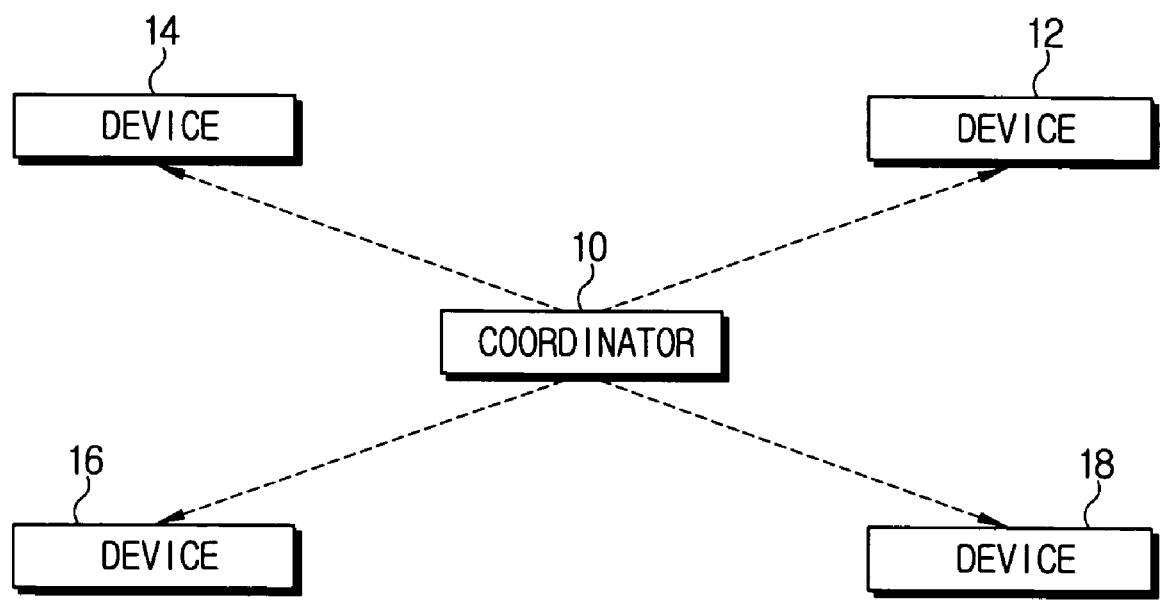
FIG. 1 is a conceptual diagram to explain network configuration of a Zigbee system in accordance with the related art.
Figure 2:
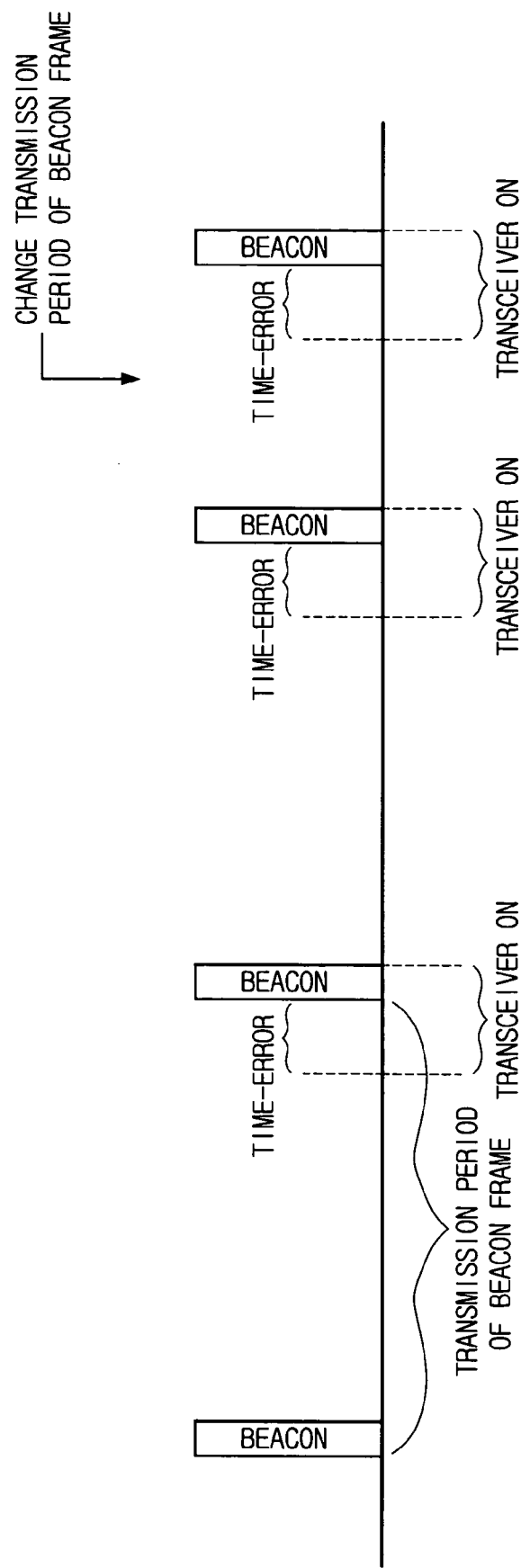
FIG. 2 is a timing diagram showing a turn-on time of a transceiver when each device receives a beacon frame from a coordinator.

Hereinafter, the present invention will be described in detail by describing exemplary embodiments of the present invention with reference to accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
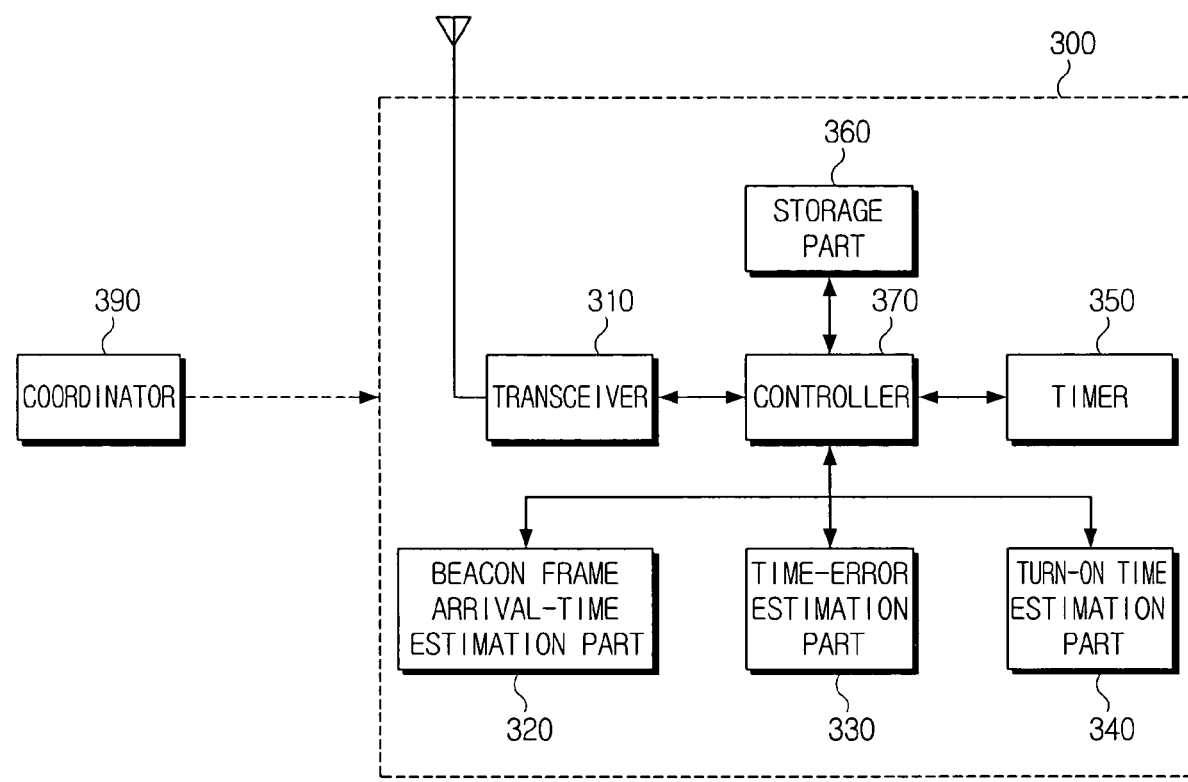
FIG. 3 is a block diagram for adaptively controlling a turn-on time in accordance with an exemplary embodiment of the present invention.

FIG. 3 illustrates a block diagram of a device for adaptively controlling a turn-on time of a transceiver in accordance with an exemplary embodiment of the present invention. Referring to FIG. 3, a device 300 includes a transceiver 310, a beacon frame arrival-time estimation part 320, a time-error estimation part 330, a turn-on time estimation part 340, a timer 350, a storage part 360 and a controller 370.

The transceiver 310 has a transmitter for transmitting packets to another devices and a receiver for receiving packets broadcasted by the coordinator 390. The device 300 can receive a beacon frame broadcasted by the coordinator 390 only at the status that the transceiver 310 of the device 300 is turned on.

The controller 370 controls the device 300 wholly. In an exemplary embodiment of the present invention, the controller 370 stores the received beacon frame into the storage part 360, and checks whether period information of the beacon frame is changed by analyzing the period information of the beacon frame.

The beacon frame arrival-time estimation part 320 estimates an arrival-time of a next beacon frame based on the changed period information of the beacon frame.

Further, the time-error estimation part 330 estimates a time-error between timers incorporated into the coordinator 390 and the device 300. The timers incorporated into the coordinator 390 and the device 300 inevitably have a time error, which is called the time-error. Part Per Minute (PPM) is used as the unit of the time-error. The Zigbee system is designed to have a timer with ±40 PPM or smaller.

The turn-on time estimation part 330 estimates a turn-on time of the transceiver 310 based on the estimated arrival-time of a next beacon frame and the time-error between the coordinator 390 and the device 300.

The timer 360 is synchronized by the control operation of the controller 370, and is used to turn on the transceiver 310 at the turn-on time of the transceiver 310. For example, in more detail, the controller 370 locates local time information of the coordinator 390, which is stored in the beacon frame, and then controls so as for the local time of the coordinator 390 and the local time of the timer 350 to be synchronized with each other. The local time means a time indicated by the timers 350 which are incorporated into the coordinator 390 and the device 300 at the time when they are manufactured.

Figure 4:
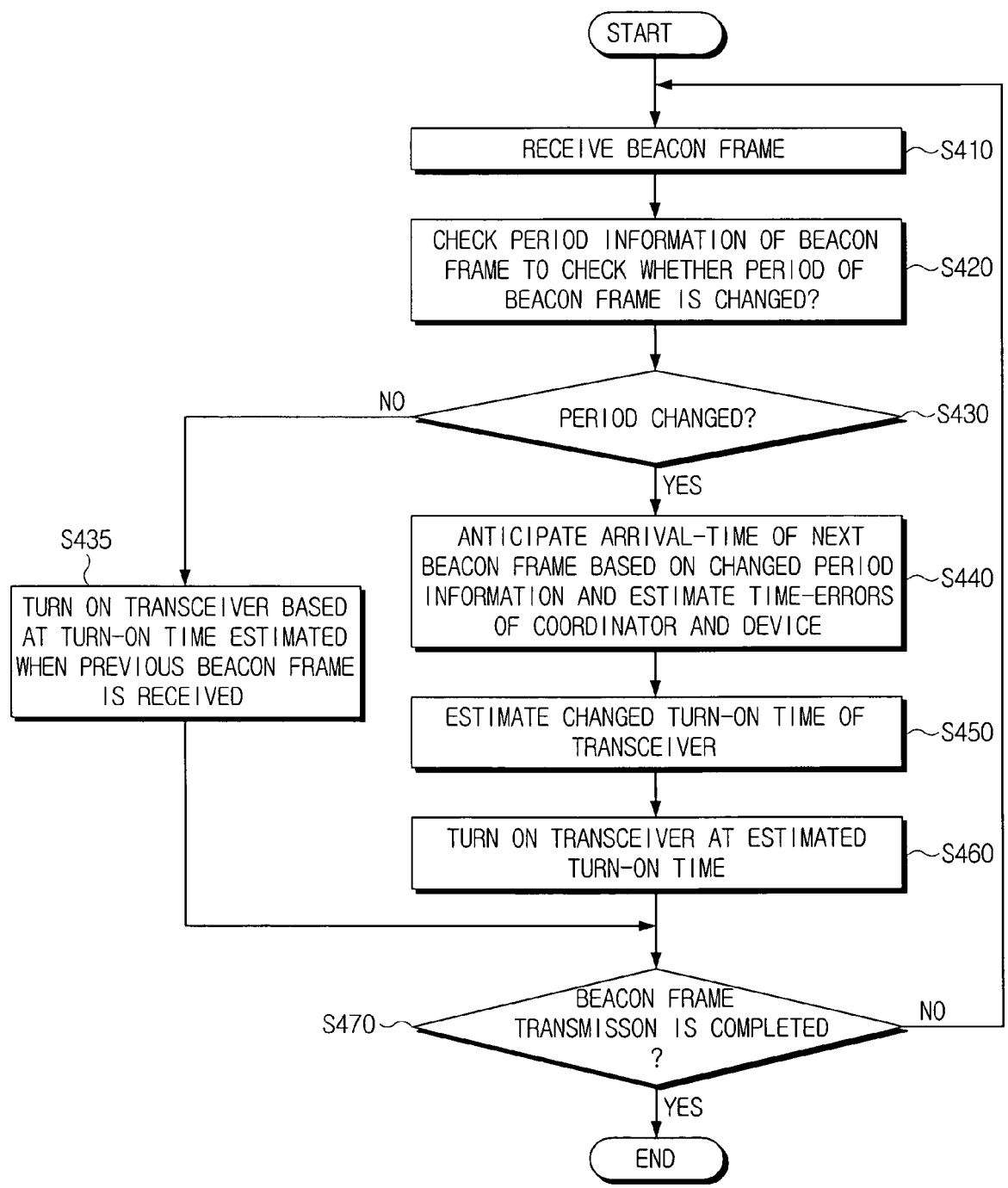
FIG. 4 is a flow chart showing a method of controlling a turn-on time of a transceiver according to an exemplary embodiment of the present invention.

FIG. 4 illustrates a flow chart showing a method of controlling a turn-on time of a transceiver in accordance with the present invention. In an exemplary embodiment of the present invention, it is assumed that the coordinator 390 periodically transmits beacon frames.

With reference to FIG. 3 and FIG. 4, a beacon frame broadcasted by a coordinator 390 is received by a device in the circumstance that the transceiver 310 is turned on (S410). At this time, the device 300 stores the received beacon frame into a storage part 360 and turns off the transceiver 310.

The beacon frame has period information of a beacon frame therein, which is transmitted by the coordinator 390. The device 300 analyzes the beacon frame stored in the storage part 360, and determines whether the period of the beacon frame is changed by checking the period information in the beacon frame (S420).

In a case where the period of the beacon frame is changed (S430; Yes), the beacon frame arrival-time estimation part 320 estimates an arrival-time of a next beacon frame based on the changed period information of the beacon frame, and the time-error estimation part 330 newly computes a time-error between timers 350 incorporated into the coordinator 390 and the device 300 (S440).

In general, since the time-error between timers 350 in the coordinator 390 and the device 300 is proportional to the period of the beacon frame, the time-error between timers 350 in the coordinator 390 and the device 300 also changes in case that the period of the beacon frame changes. That is one reason why the time-error is newly estimated. The arrival-time of the next beacon frame is estimated by adding the changed period of the beacon frame to the arrival-time of the currently arrived beacon frame.

Next, the turn-on time estimation part 340 of the device 300 estimates a changed turn-on time of the transceiver 310 based on the newly estimated arrival-time of the next beacon frame and the newly estimated time-error between the timers 350 in the coordinator 390 and the device 300 (S450).

For example, in the circumstance that n-th beacon frame is currently received, in case that the changed period of the beacon frame is "T", and the changed time-errors of the coordinator 390 and the device 300 are "a" and "b," respectively, a turn-on time of the transceiver 310 for receiving n+1-th beacon frame is estimated as follows:

That is, the turn-on time of the transceiver equals to {the arrival-time of the n-th beacon frame+changed period T of the beacon frame−(the changed time-error "a" of the coordinator+the changed time-error "b" of the device)}.

The turn-on estimation part 340 stores the estimated turn-on time of the transceiver 310 and provides the controller 370 with the estimated turn-on time information. The controller 370 controls the transceiver 310 to be turned on at the turn-on time received from the turn-on time estimation part 340 (S460).

Meanwhile, in step S430, in a case where the period of the beacon frame does not change (No), since the estimated arrival-time of the next beacon frame, and time-errors of the coordinator 390 and the device 300 do not change, the turn-on time of the transceiver also does not change. Accordingly, in such case, the controller controls the transceiver 310 so as to be turned on at the turn-on time estimated when the previous beacon frame is received.

On one hand, in a case where there are more beacon frames to be broadcasted by the coordinator, i.e. transmission of the beacon frame is not completed (S470), the steps described above may be repeatedly performed.

By this method, in a case where the period of the beacon frame changes, since the turn-on time of the transceiver is adaptively controlled, it is possible to prevent the power from being unnecessarily consumed.

As described above, in accordance with the present invention, since it is possible to adaptively control the turn-on time of the transceiver in response to the period of the beacon frame, unnecessary operations of the transceiver can be prevented. Accordingly, it is possible to reduce power consumption in comparison with a convention method in which the transceiver is turned on at a fixed time regardless of the period of the beacon frame.

Although exemplary embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A device for adaptively controlling a turn-on time of a transceiver, comprising:
    a transceiver which receives a beacon frame broadcasted by a device coordinator;
    a controller which determines whether a period of the beacon frame is changed by checking period information in the beacon frame;
    a beacon frame arrival-time estimation part which estimates an arrival-time of a next beacon frame to be received based on the changed period information of the beacon frame;
    a time-error estimation part which estimates time-errors of the coordinator and the device based on the changed period information of the beacon frame; and
    a turn-on time estimation part which estimates a turn-on time of the transceiver based on the estimated beacon frame arrival-time and the estimated time-errors.

2. The device as claimed in claim 1, wherein the controller controls the transceiver to be turned on at the turn-on time estimated by the turn-on time estimation part.

3. The device as claimed in claim 1, wherein the turn-on time of the transceiver is estimated by the following equation:

Turn-on time of transceiver=estimated arrival-time of beacon frame−(changed time error of coordinator+changed time error of device).

4. The device as claimed in claim 1, wherein the time-errors are proportional to the period of the beacon frame.

5. The device as claimed in claim 1, further comprising a storage medium for storing the received beacon frame.

6. A method of controlling a turn-on time of a transceiver, the method comprising:
    receiving a beacon frame broadcasted by a coordinator;
    checking period information in the received beacon frame and determining whether a period of the beacon frame is changed;
    estimating a turn-on time of the transceiver based on the changed period if it is determined the period of the beacon frame is changed; and
    controlling the transceiver to be turned on at the estimated turn-on time;
    wherein the estimating the turn-on time of the transceiver comprises:
    estimating an arrival-time of a next beacon frame based on the changed period and estimating time-errors of the coordinator and the device, respectively; and
    estimating a turn-on time of the transceiver based on the estimated arrival-time of the beacon frame and the estimated time-errors of the coordinator and the device.

7. The method as claimed in claim 6, wherein the turn-on time of the transceiver is changed if the period of the beacon frame is changed.

8. The method as claimed in claim 6, wherein the turn-on time of the transceiver may be estimated by the following equation:

Turn-on time of transceiver=estimated arrival-time of beacon frame+changed period of beacon frame−(changed time-error of coordinator+changed time-error of device).

9. The method as claimed in claim 6, wherein the time-errors are proportional to the period of the beacon frame.

* * * * *